US012654061B2

(12) United States Patent  
Kao et al.

(10) Patent No.: US 12,654,061 B2  
(45) Date of Patent: Jun. 16, 2026

(54) METHOD FOR MANUFACTURING A CUSHION BODY WITH A CONCAVE-CONVEX STRUCTURE AND MOLD FOR MANUFACTURING CUSHION BODY WITH CONCAVE-CONVEX STRUCTURE

(71) Applicant: SIMPLE GREEN CO., LTD., Changhua County (TW)

(72) Inventors: Chen-I Kao, Changhua (TW); Shang-Chieh Kao, Changhua County (TW); Chi-Hung Tang, Changhua County (TW); Yung-Ping Lai, Changhua County (TW); Yu-Jen Pan, Changhua County (TW); Yu-Cheng Chang, Changhua County (TW)

(73) Assignee: SIMPLE GREEN CO., LTD., Huatan Township, Changhua County (TW)

( * ) Notice: Subject to any disclaimer, the term of this patent is extended or adjusted under 35 U.S.C. 154(b) by 39 days.

(21) Appl. No.: 17/917,020

(22) PCT Filed: Apr. 14, 2020

(86) PCT No.: PCT/CN2020/084585  
§ 371 (c)(1),  
(2) Date: Oct. 5, 2022

(87) PCT Pub. No.: WO2021/207905  
PCT Pub. Date: Oct. 21, 2021

(65) Prior Publication Data  
US 2023/0149770 A1    May 18, 2023

(51) Int. Cl.  
A63B 21/00    (2006.01)  
B29C 43/46    (2006.01)  
B29C 43/56    (2006.01)  
B29C 71/02    (2006.01)

(52) U.S. Cl.  
CPC .......... *A63B 21/4037* (2015.10); *B29C 43/46* (2013.01); *B29C 43/56* (2013.01);  
(Continued)

(58) Field of Classification Search  
CPC ....... A63B 21/4037; A63B 6/00; B29C 43/46; B29C 43/56; B29C 2043/463;  
(Continued)

(56) References Cited

U.S. PATENT DOCUMENTS 4,797,246 A * 1/1989 Reinke ...................... B26F 1/26  
264/237  
5,096,652 A 3/1992 Uchiyama et al.  
(Continued)

FOREIGN PATENT DOCUMENTS

CN    101224653 A    7/2008  
CN    101434137 A    5/2009  
(Continued)

*Primary Examiner* — S. Behrooz Ghorishi  
(74) *Attorney, Agent, or Firm* — Cheng-Ju Chiang

(57) ABSTRACT

The present invention provides a method for manufacturing a cushion body with a concave-convex structure and a mold for manufacturing the cushion body with the concave-convex structure. A first elastic sheet is pasted on a second elastic sheet. The first elastic sheet is a closed-hole elastic material. The second elastic sheet is an opened-hole elastic material. The first elastic sheet and the second elastic sheets are combined and heated. Finally, the first elastic sheet and the second elastic sheet that are heated are sucked using the mold under a negative pressure from one side of the second elastic sheet and cooled at the same time, so that the first elastic sheet and the second elastic sheet can be deformed using the concave-convex structure of the mold and cooled to be shaped, thereby obtaining the cushion body with the concave-convex structure.

4 Claims, 6 Drawing Sheets

(52) U.S. Cl.
   CPC ........... *C08J 7/08* (2013.01); *B29C 2043/463* (2013.01); *C08J 2387/00* (2013.01); *C08J 2457/00* (2013.01)

(58) Field of Classification Search
   CPC .............. B29C 69/00; B29C 2043/461; B29C 2043/561; B29C 2043/562; B29C 2043/563; C08J 7/08; C08J 2387/00; C08J 2457/00
   See application file for complete search history.

(56)             References Cited

U.S. PATENT DOCUMENTS

2008/0014413 A1 *  1/2008  Tanabe ................... D04H 1/413
                                                    264/103

2012/0240336 A1    9/2012  Dandapure et al.
2016/0075910 A1 *  3/2016  Omori ...................... C08J 7/046
                                                    428/480

FOREIGN PATENT DOCUMENTS

| | | | | |
|---|---|---|---|---|
| CN | 101434140 | A |   | 5/2009 |
| CN | 102642437 | A | * | 8/2012 |
| CN | 103624968 | A |   | 3/2014 |
| CN | 104448532 | A |   | 3/2015 |
| CN | 109421322 | A |   | 3/2019 |
| CN | 109747141 | A |   | 5/2019 |
| JP | H10-109357 | A |   | 4/1998 |
| TW | 1259140 | B |   | 8/2006 |
| TW | 200916156 | A |   | 4/2009 |
| TW | 201836859 | A | * | 10/2018 |
| TW | 201912391 | A |   | 4/2019 |
| TW | 202037485 | A | * | 10/2020 |

* cited by examiner

100

METHOD FOR MANUFACTURING A CUSHION BODY WITH A CONCAVE-CONVEX STRUCTURE AND MOLD FOR MANUFACTURING CUSHION BODY WITH CONCAVE-CONVEX STRUCTURE

BACKGROUND OF INVENTION

1. Field of the Invention

The present invention relates to the technical field of an elastic cushion, and more specifically is directed to a method for manufacturing a cushion body with a concave-convex structure and a mold for manufacturing the cushion body with the concave-convex structure.

2. Description of Related Art

An elastic cushion body with a concave-convex structure on a surface can provide anti-skid, shock-absorption and other functions, thereby being suitable for sports (such as a yoga mat, etc.).

A conventional method of manufacturing the elastic cushion body with a concave-convex structure on a surface either require a base material with a concave-convex structure to be pasted with another elastic sheet and then heat-aged or foamed, or pasting two elastic sheets first and then embossing the elastic cushion body using a closed hot pressing mold.

But, prefabricating the base material with the concave-convex structure first and then pasting with another elastic sheet cause the process is more complicated. And, when pasting and embossing two elastic sheets using a closed hot pressing mold, each elastic sheet must be punctured in advance to create a large amount of holes, so, through the process for hot-pressing, the generated air bubbles can be discharged through punctured holes, in advance to punctureda each elastic sheet cause the process is more complicated too.

SUMMARY OF THE INVENTION

A main objective of the present invention is to provide a method for manufacturing a cushion body with a concave-convex structure and a mold for manufacturing the cushion body with the concave-convex structure, which can produce the cushion body with the concave-convex structure on a surface without using a base material with a concave-convex structure, and is concise, effective, and very practical.

Therefore, to realize the above object, the present invention provides a method for manufacturing a cushion body with a concave-convex structure, comprising at least the following steps: a) pasting: a first elastic sheet is pasted to a second elastic sheet, the first elastic sheet is a closed-hole elastic material, and the second elastic sheet is an open-hole elastic material; b) heating: the first elastic sheet and the second elastic sheet that are combined are heated and then output; c) negative pressure sucking while cooling and shaping: the first elastic sheet and the second elastic sheet that are heated are sucked under a negative pressure from one side of the second elastic sheet and cooled at the same time, so that the first elastic sheet and the second elastic sheet can be deformed while being cooled and shaped, so as to obtain the cushion body with the concave-convex structure.

In addition, the present invention also provides a method for manufacturing a cushion body with a concave-convex structure, comprising at least the following steps: a) pasting a first elastic sheet on a second elastic sheet, the first elastic sheet being a closed-hole elastic material, and the second elastic sheet being a partially open-holed and partially closed-holed elastic material; b) heating the first elastic sheet and the second elastic sheet that are combined; c) sucking under a negative pressure the first elastic sheet and the second elastic sheet that are heated from one side of the second elastic sheet and cooled at the same time, so that the first elastic sheet and the second elastic sheet can be deformed while being cooled and shaped, so as to obtain the cushion body with the concave-convex structure.

Preferably, wherein in step a), the open-hole elastic material and the closed-hole elastic material of the second elastic sheet are combined in a strip-shaped staggered manner and extruded out as a sheet shape.

Preferably, wherein in step a), the open-hole elastic material and the closed-hole elastic material of the second elastic sheet are combined in a lump-shape and extruded out as the sheet shape.

Preferably, wherein in step c), a positive pressure is applied to a surface of the first elastic sheet at the same time to assist the negative pressure in sucking the second elastic sheet.

In addition, the present invention also provides a mold for manufacturing a cushion body with a concave-convex structure, comprising: a mold body with a concave-convex structure on a surface, a first elastic sheet and a second elastic sheet that are heated and softened being capable of being pasted on the concave-convex structure, and the mold body being internally provided with a plurality of air extraction holes communicated with one side of the second elastic sheet, so that one side of the second elastic sheet is capable of being pumped and sucked by negative pressure, therefore, the second elastic sheet being capable of being deformed in a concave and a convex; and a cooling unit provided at one side of the mold body for cooling with a fluid one of the first elastic sheet and the second elastic sheet or the mold body.

Preferably, wherein the mold body is roughly in a shape of a round rod, a surface of the mold body has a concave-convex structure, the cooling unit is arranged inside the mold body to provide a cooling fluid to indirectly cool the first elastic sheet and the second elastic sheet via the mold body, and each of the air extraction holes is connected to an air extraction channel arranged inside the mold body.

Preferably, wherein the mold body is generally flat-shaped, a mold cavity is concavely provided on the mold body, a bottom side surface of the mold cavity is provided with the concave-convex structure, the cooling unit is provided inside the mold body to provide the cooling fluid to indirectly cool the first elastic sheet and the second elastic sheet via the mold body, and each of the air extraction holes is connected to the mold cavity and the air extraction channel arranged inside the mold body.

Preferably, wherein the cooling unit is arranged on an outer side or a top side of the mold body to provide the cooling fluid to directly cool the first elastic sheet and the second elastic sheet.

Preferably, further comprising a positive pressure unit, the positive pressure unit is capable of applying a positive pressure to the first elastic sheet to assist the negative pressure in sucking the second elastic sheet.

BRIEF DESCRIPTION OF THE DRAWINGS

Hereinafter, a plurality of preferred embodiments of the present invention are cited, and further detailed description is given in conjunction with the drawings as follows.

DETAILED DESCRIPTION OF THE INVENTION

Figure 1:
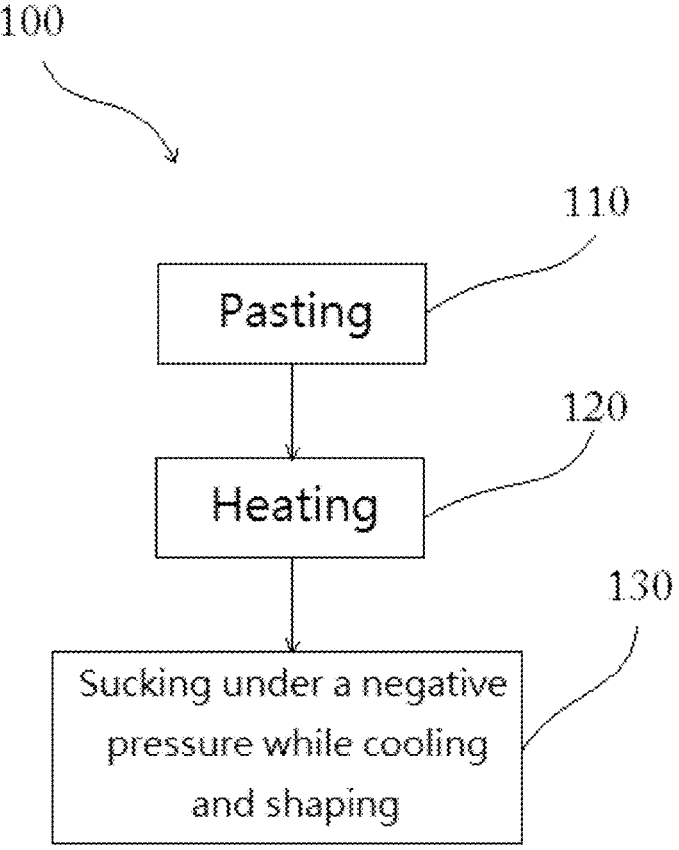
FIG. 1 is a flow chart of a manufacturing method of a preferred embodiment of the present invention.
Figure 2:
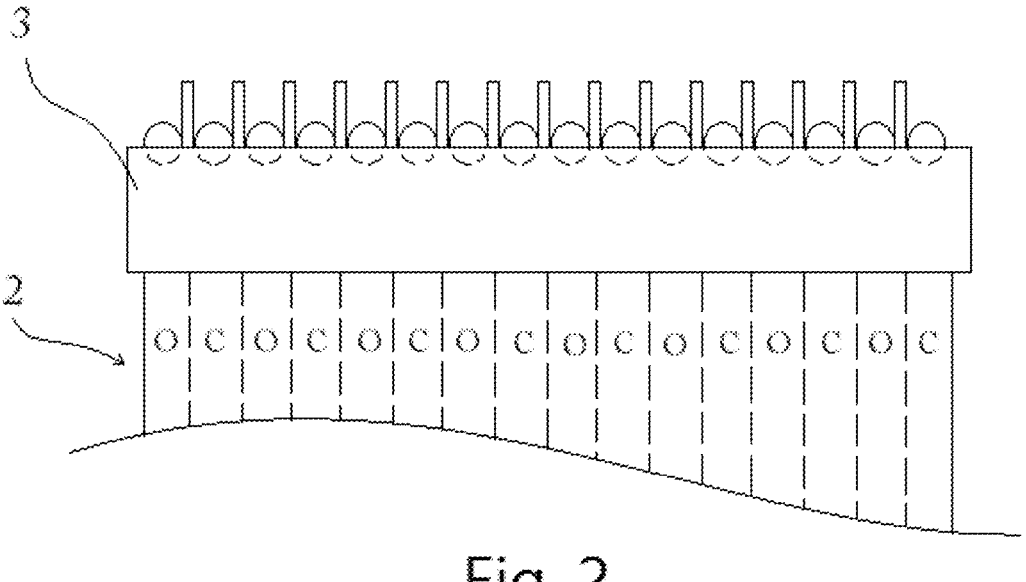
FIG. 2 is a schematic diagram of extruding a second elastic sheet by an extruder in a pasting step of a manufacturing method according to a preferred embodiment of the present invention.
Figure 3:
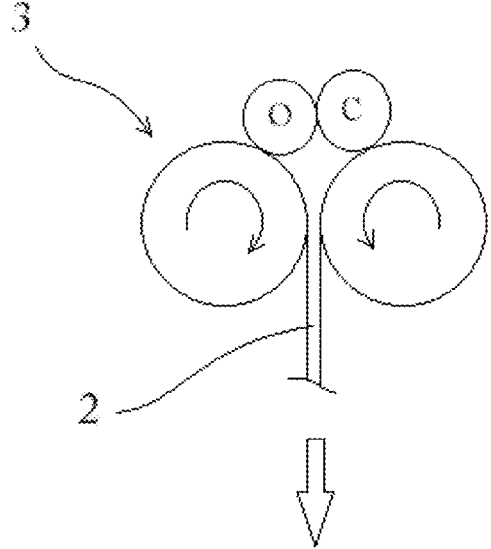
FIG. 3 is a schematic diagram of extruding a second elastic sheet by another extruder in a pasting step of a manufacturing method according to a preferred embodiment of the present invention.
Figure 4:
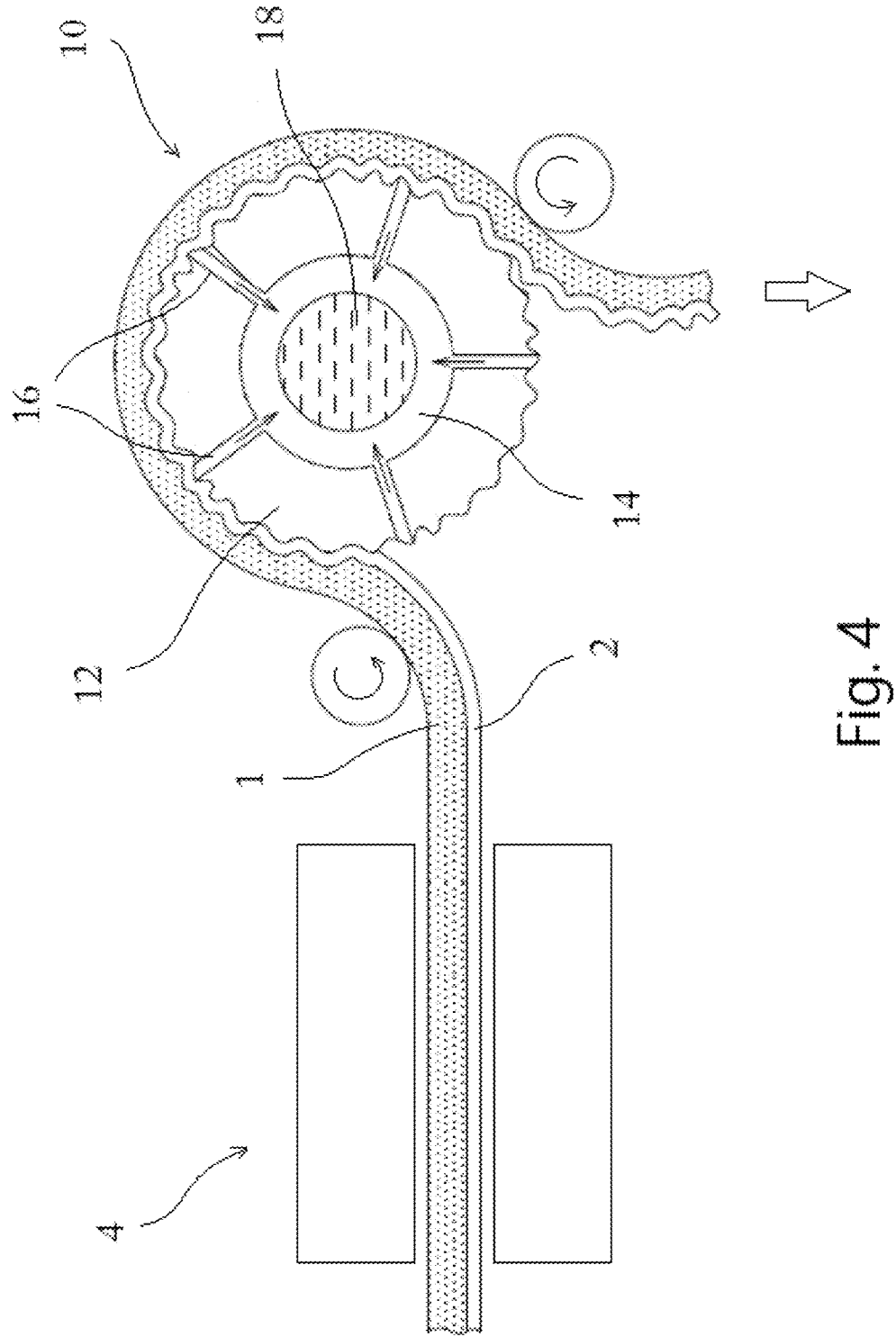
FIG. 4 is a schematic diagram of heating and negative-pressure suction and simultaneous cooling and shaping steps and a mold in a preferred embodiment of the present invention.

First, please refer to FIG. 1, a preferred embodiment of the present invention has a method 100 for manufacturing a cushion body with a concave-convex structure, including the following steps:

a) pasting 110: the first elastic sheet 1 is pasted on the second elastic sheet 2. The first elastic sheet 1 is made of thermoplastic elastic material (TPE), EVA, PVC, nitrile rubber (NBR), styrene-butadiene rubber (SBR) and other closed-hole elastic materials. The second elastic sheet 2 is made of materials such as polyurethane PU, NR, TPU, etc., which can be fully open-hole elastic materials or partially open-hole elastic materials. Part of the open-hole elastic material is formed by a mixture of the open-hole elastic material and the closed-hole elastic material, and has a manufacturing method as shown in FIG. 2, that is, a strip-shaped open-hole elastic material (O) and the closed-hole elastic material (C) are combined and fed into a conventional extruder 3 in a staggered manner to extrude a second partially open-hole sheet-shaped elastic sheet 2. As shown in FIG. 3, a lump-shaped open-hole elastic material (O) and the closed-hole elastic material (C) are simultaneously input into the conventional extruder 3 to extrude the partially open-hole second elastic sheet 2. Of course, a graphic block can also be fit-pressed on an open-hole and closed-hole hybrid elastic material. The graphic block can be composed of the open-hole elastic material or the closed-hole elastic material that is arranged at different positions of a graphic and can be arranged depending on needs of a product. The graphic block with a concave-convex structure can be presented on a cushion body product.

b) Heating 120: as shown in FIG. 4, the first elastic sheet and the second elastic sheet 1 and 2 that are combined are heated to a temperature of about 150-180° C. through a heater 4 and then output, so that the first elastic sheet and the second elastic sheet 1 and 2 are softened and fit.

c) sucking under a negative pressure while cooling and shaping 130: next, the first elastic sheet 1 and the second elastic sheet 2 that are softened are extended on a surface of the mold 10 that can manufacture the cushion body with the concave-convex structure. The mold 10 includes a round rod-shaped mold body 12 that is rotatable along an axis, has the concave-convex structure on a surface thereof, and is provided with an air extraction channel 14 and a plurality of air extraction holes 16 (the air extraction channel 14 is connected to a conventional air extraction apparatus) connecting the air extraction channel 14 and one side of the second elastic sheet 2 side, so as to perform air extraction and negative pressure suction (vacuum) on one side of the second elastic sheet 2. Therefore, the second elastic sheet 2 can be affected by the concave-convex structure on the surface of the mold body 12, to generate the concave-convex deformation (a constituting portion of the open-hole elastic material of the second elastic sheet 2 is used for air bubbles between pasting surfaces of the first elastic sheet 1 and the second elastic sheet 2 to be sucked by the negative pressure to be drawn out). A cooling unit 18 is extended in the mold body 12 (connected to a water supply apparatus, not communicated to the air extraction channel 14 and the air extraction hole 16) to provide a fluid (such as cold water) to cool the mold body 12, thereby indirectly cooling the first elastic sheet 1 and the second elastic sheet 2, and make the first elastic sheet 1 and the second elastic sheet 2 be hardened to be shaped.

In this way, the cushion body with the concave-convex structure can be obtained.

As can be seen from the forgoing, the method 100 for manufacturing the cushion body with the concave-convex structure of the present invention does not need to use a material with a concave-convex structure via the successive steps of pasting 110, heating 120, sucking under the negative pressure as well as cooling and shaping 130 at the same time. The cushion body with the concave-convex structure on the surface can be continuously manufactured without the material with the concave-convex structure, which is simple, effective and practical.

Secondly, when the second elastic sheet 2 is composed of the partially open-hole elastic material in step a), the concave-convex structure formed on the surface of the cushion body is not only shaped by a pre-set concave-convex shape on the surface of the mold body 12, but also influenced by ventilation or air impermeability of different parts of the second elastic sheet 2 including the open-hole and closed-hole elastic materials, so that different-height fluctuations are formed, thereby obtaining more varied concave-convex structure changes. Specifically, compared with an air-impermeability closed-hole elastic material, the open-hole elastic material is ventilative and is less affected by a suction force of the negative pressure. Therefore, a position of the open-hole elastic material of the second elastic sheet 2 has a raised height lower than a raised height of the closed-hole elastic material.

Figure 5:
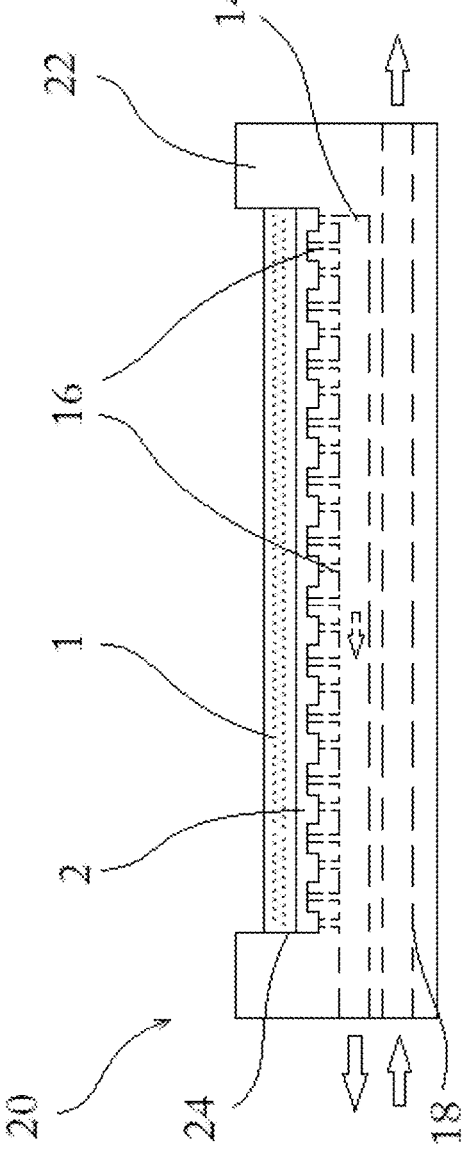
FIG. 5 is a schematic diagram of another preferred embodiment of a mold of the present invention.

In addition, the mold body 12 of the forgoing mold 10 for manufacturing the cushion body with the concave-convex structure is in a shape of a round rod. FIG. 5 is another mold 20 of the present invention. The mold body 22 of the mole is a plate-shape. A mold cavity 24 is further concavely provided on the mold body. The concave-convex structure is arranged on a bottom side surface of the mold cavity 24. The mold body 22 is also provided with the forgoing air extraction channel 14, the air extraction holes 16, and a cooling unit 18. Each of the air extraction holes 16 is connected to the mold cavity 24. Therefore, the first elastic sheet 1 and the second elastic sheet 2 that are softened are placed in the mold cavity 24 to perform the forgoing step c).

Of course, the cooling unit 18 of the mold 10 or the mold 20 is not limited to be disposed inside the mold bodies 12, 22, but can also be disposed on an outer side and a top side of the mold bodies 12, 22. A cooling fluid is not limited to be cold water, and can also be a fluid such as a cooling gas. For example, when the cooling unit 18 is arranged on the outer side and the top side of the mold bodies 12 and 22, the cooling fluid can be the cold water or the cooling gas, which can be directly sprayed on a surface of the first elastic sheet 1 for cooling.

Figure 6:
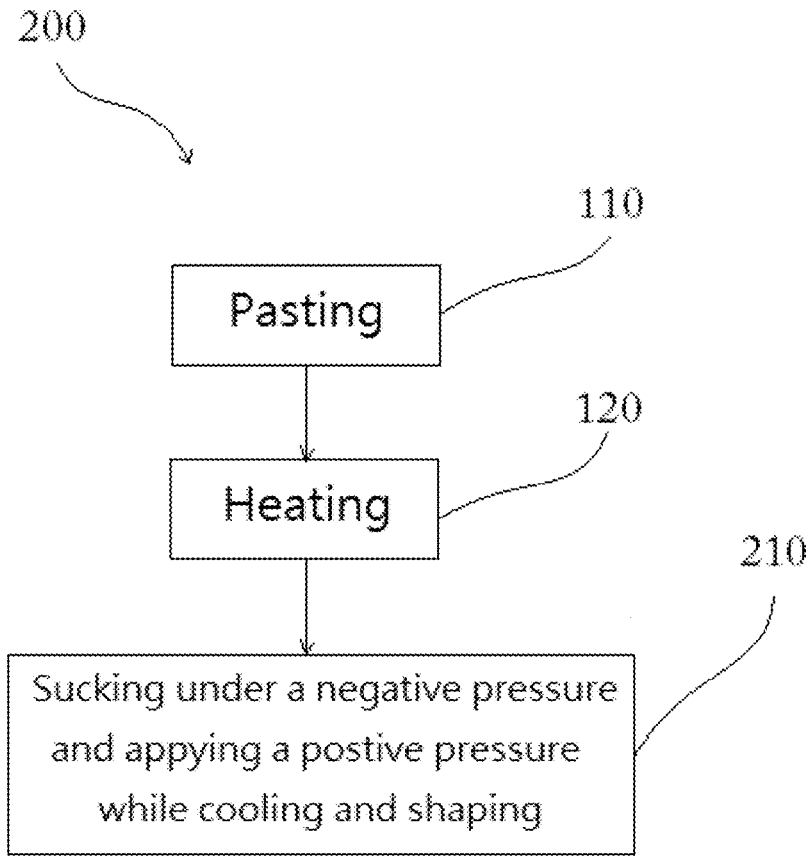
FIG. 6 is a flow chart of another preferred embodiment of the present invention.

Furthermore, as shown in FIG. 6, another preferred embodiment of the present invention is a method 200 for manufacturing the cushion body with the concave-convex structure, which is different from the forgoing method 100 manufacturing the cushion body in that the step c) is negative pressure suction, application of positive pressure while cooling and shaping 210, that is, when one side of the second elastic sheet 2 is pumped and sucked by the negative pressure, a pressure is directly applied to the first elastic sheet 1 (the first elastic sheet 1 and the second elastic sheet 2 are under the positive pressure) to assist the negative pressure in sucking the second elastic sheet 2, which can enhance a shaping effect of the concave-convex structures of the first elastic sheet 1 and the second elastic sheet 2.

The forgoing positive pressure applied to the first elastic sheet 1 and the second elastic sheet 2 can be a pressure of a cold gas sprayed by the cooling unit 18 disposed on the outer side and the top side of the mold bodies 12 and 22. In other words, the cold gas sprayed by the cooling unit 18 is not only used to cool the first elastic sheet 1 and the second elastic sheet 2, but also is a source of the positive pressure.

Figure 7:
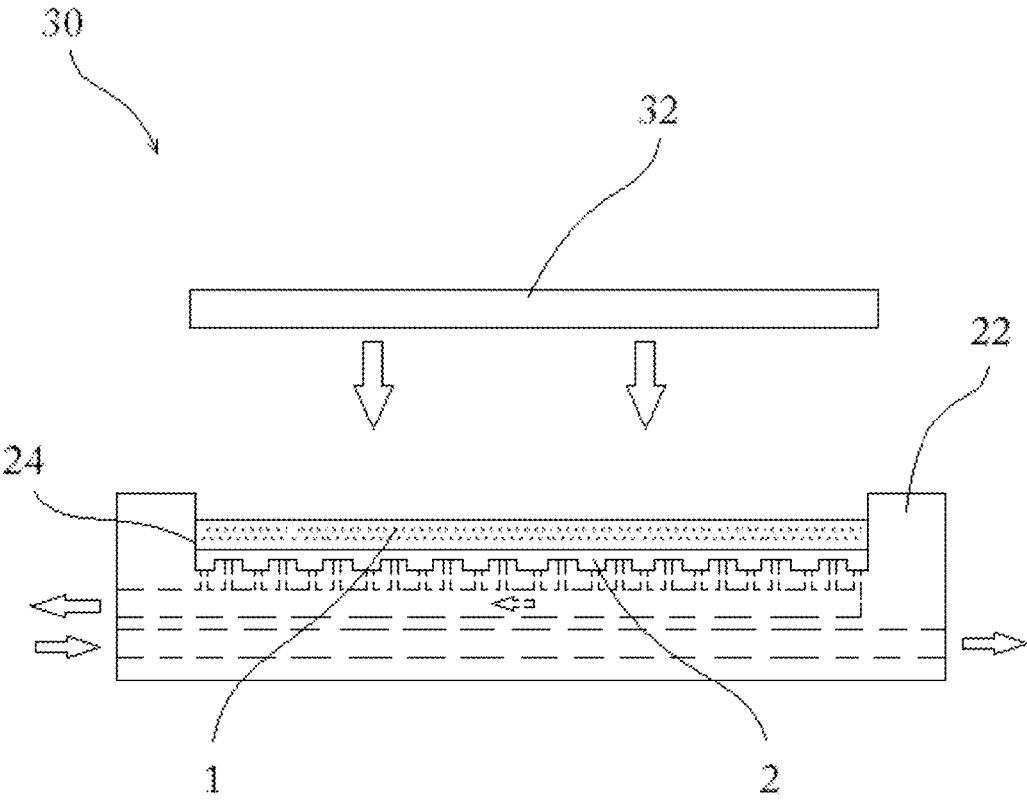
FIG. 7 is a schematic diagram of a mold according to another preferred embodiment of the present invention.

Secondly, besides a gas pressure, the pressure of the first elastic sheet and the second elastic sheet 1 and 2 can also be generated by a pressure assembly. FIG. 7 is another mold 30, of which constitutions are the same as the mold 20. A difference is that the mold 30 further includes a positive pressure unit 32, which is disposed above the mold body 22, is made of a flexible elastic temperature-resistant material, and can be in the form of a plate or an inflatable sphere. After the first elastic sheet 1 and the second elastic sheet 2 that are softened are placed in the mold cavity 24, the positive pressure unit 32 is moved down to directly contact and press the first elastic sheet 1. The positive pressure unit 32 has the effect of trimming the first elastic sheet 1 and the second elastic sheet 2.

It is mentioned that the forgoing methods 100 and 200 for manufacturing the cushion body of the present invention are to manufacture a double-layered cushion body with a concave-convex structure on a surface. Of course, the present invention can also manufacture a multi-layered cushion body with a concave-convex structure on a surface. For example, in step a), an anti-stretching sheet (such as nylon, fiber and other fabrics, and non-woven fabrics) is inserted between the first elastic sheet 1 and the second elastic sheet 2, so as to produce an effect of restricting extension of the cushion body, or/and an anti-slip sheet (such as a natural rubber material) is laid on an outer side of the elastic sheet 2 to make the cushion body have an anti-slip effect, or/and another anti-stretching sheet (such as Nylon, fiber and other fabrics, and non-woven fabrics) is inserted between the second elastic sheet 2 and the anti-slip sheet.

While the means of specific embodiments in the present invention have been described by reference drawings, numerous modifications and variations could be made thereto by those skilled in the art without departing from the scope and spirit of the invention set forth in the claims. The modifications and variations should be in a range limited by the specification of the present invention.

What is claimed is:

1. A method for manufacturing a cushion body with a concave-convex structure, comprising at least the following steps:

pasting a first elastic sheet of closed-cell elastic material to a second elastic sheet of open-cell elastic material;

heating and then outputting the first elastic sheet pasted to the second elastic sheet;

applying a negative pressure from one side of the second elastic sheet while extending the heated first elastic sheet pasted to the second elastic sheet on a surface of a mold having the concave-convex structure and cooling the pasted first and second elastic sheets; and applying a positive pressure via directly spraying a cooling gas on a surface of the first elastic sheet at the same time to assist the negative pressure in sucking the second elastic sheet, so that the first elastic sheet and the second elastic sheet are deformed while being cooled and shaped, so as to obtain the cushion body with the concave-convex structure.

2. A method for manufacturing a cushion body with a concave-convex structure, comprising at least the following steps:

pasting a first elastic sheet of closed-cell elastic material on a second elastic sheet of partially open-cell and partially closed-cell elastic material;

heating the first elastic sheet and the second elastic sheet that are combined;

sucking, under a negative pressure, the previously combined and heated first elastic sheet and second elastic sheet from one side of the second elastic sheet while the previously combined and heated first and second elastic sheets are extended on a surface of a mold having the concave-convex structure and cooled; and applying a positive pressure to a surface of the first elastic sheet at the same time to assist the negative pressure in sucking the second elastic sheet, so that the first elastic sheet and the second elastic sheet are deformed while being cooled and shaped, so as to obtain the cushion body with the concave-convex structure and such that the concave-convex structure has a lower raised height corresponding to regions of the second elastic sheet of open-cell material than a raised height corresponding to regions of the second elastic sheet of closed-cell material.

3. The method for manufacturing the cushion with the concave-convex structure according to claim 2, wherein in step a), the open-hole elastic material and the closed-hole elastic material of the second elastic sheet are combined in a strip-shaped staggered manner and extruded out as a sheet shape.

4. The method for manufacturing the cushion with the concave-convex structure according to claim 2, wherein the open-cell elastic material, in a lump-shape, and the closed-cell elastic material of the second elastic sheet are simultaneously combined and extruded out as the partially open-cell and partially closed-cell elastic material of the second elastic sheet in a sheet shape.

* * * * *